United States Patent
Gorsuch et al.

(10) Patent No.: US 6,388,999 B1
(45) Date of Patent: May 14, 2002

(54) DYNAMIC BANDWIDTH ALLOCATION FOR MULTIPLE ACCESS COMMUNICATIONS USING BUFFER URGENCY FACTOR

(75) Inventors: Thomas E. Gorsuch, Indialantic; Carlo Amalfitano, Melbourne Beach; James A. Proctor, Indialantic, all of FL (US)

(73) Assignee: Tantivy Communications, Inc., Melbourne, FL (US)

( * ) Notice: Subject to any disclaimer, the term of this patent is extended or adjusted under 35 U.S.C. 154(b) by 0 days.

(21) Appl. No.: 09/088,527

(22) Filed: Jun. 1, 1998

Related U.S. Application Data

(63) Continuation of application No. 09/030,049, filed on Feb. 24, 1998, now Pat. No. 6,236,647, and a continuation of application No. 08/992,760, filed on Dec. 17, 1997, now Pat. No. 6,081,536, and a continuation of application No. 08/922,759, filed on Dec. 17, 1997, now Pat. No. 6,151,332.

(51) Int. Cl.[7] ............................................... H04L 12/28
(52) U.S. Cl. ......................... 370/335; 370/468; 370/412
(58) Field of Search ................................. 370/320, 310, 370/335, 465, 342, 431, 441, 522, 468, 412; 375/347

(56) References Cited

U.S. PATENT DOCUMENTS

| | | | |
|---|---|---|---|
| 4,675,863 A | 6/1987 | Paneth et al. | 370/50 |
| 4,817,089 A | 3/1989 | Paneth et al. | 370/95 |
| 4,912,705 A | 3/1990 | Paneth et al. | 370/95.1 |
| 5,022,024 A | 6/1991 | Paneth et al. | 370/50 |
| 5,114,375 A | 5/1992 | Wellhausen et al. | 446/246 |

(List continued on next page.)

FOREIGN PATENT DOCUMENTS

| | | |
|---|---|---|
| EP | 0 526 106 A2 | 2/1993 |
| EP | 0 682 423 A2 | 11/1995 |
| EP | 0 719 062 A2 | 6/1996 |
| WO | WO 96/08934 | 3/1996 |
| WO | WO 96/37081 | 11/1996 |
| WO | WO 97/23073 | 6/1997 |
| WO | WO 97/46044 | 12/1997 |

OTHER PUBLICATIONS

Melanchuk, et al., "CDPD and Emerging Digital Cellular Systems," *Digest of Papers of COMPCON*, Computer Society Conference 1996, Technologies for the Information Superhighway, Santa Clara, CA., No. Conf. 41, pp. 2–8 ( Feb. 25, 1996), XP000628458 Institute of Electrical and Electronics Engineers.

*Primary Examiner*—Chau Nguyen
*Assistant Examiner*—Alexander O. Boakye
(74) *Attorney, Agent, or Firm*—Hamilton, Brook, Smith & Reynolds, P.C.

(57) ABSTRACT

A technique for providing high speed data service over standard wireless connections via an unique integration of protocols and existing cellular signaling, such as is available with Code Division Multiple Access (CDMA) type systems through more efficient allocation of access to CDMA channels. For example, when more users exist than channels, the invention determines a set of probabilities for which users will require channel access at which times, and dynamically assigns channel resources accordingly. Channel resources are allocated according to a buffer monitoring scheme provided on forward and reverse links between a base station and multiple subscriber units. Each buffer is monitored over time for threshold levels of data to be transmitted in that buffer. For each buffer, a probability is calculated that indicates how often the specific buffer will need to transmit data and how much data will be transmitted. This probability takes into account the arrival rates of data into the buffer, as well as which thresholds within the buffer are exceeded, as well as which resources in the form of channels are already allocated to the subscriber unit.

22 Claims, 4 Drawing Sheets

U.S. PATENT DOCUMENTS

| | | | |
|---|---|---|---|
| 5,282,222 A | 1/1994 | Fattouche et al. | 375/1 |
| 5,325,419 A | 6/1994 | Connolly et al. | 379/60 |
| 5,412,429 A | 5/1995 | Glover | 348/398 |
| 5,585,850 A | 12/1996 | Schwaller | 348/388 |
| 5,617,423 A | 4/1997 | Li et al. | 370/426 |
| 5,655,001 A | 8/1997 | Cline et al. | 370/328 |
| 5,657,358 A | 8/1997 | Paneth et al. | 375/356 |
| 5,687,194 A | 11/1997 | Paneth et al. | 375/283 |
| 5,697,059 A | 12/1997 | Carney | 455/34.1 |
| 5,859,879 A * | 1/1999 | Bolgiano et al. | 375/347 |
| 6,052,385 A * | 4/2000 | Kanerva et al. | 370/468 |
| 6,097,733 A * | 8/2000 | Basu et al. | 370/468 |

* cited by examiner

DYNAMIC BANDWIDTH ALLOCATION FOR MULTIPLE ACCESS COMMUNICATIONS USING BUFFER URGENCY FACTOR

CROSS REFERENCE TO RELATED APPLICATION(S)

This application is related to a prior pending U.S. patent application Ser. No. 08/992,760 filed Dec. 17, 1997 now U.S. Pat. No. 6,081,536 entitled "Dynamic Bandwidth Allocation to Transmit a Wireless Protocol Across a Code Division Multiple Access (CDMA) Radio Link" and a prior pending U.S. patent application Ser. No. 08/992,759 now U.S. Pat. No. 6,151,332 filed Dec. 17, 1997 entitled "Protocol Conversion and Bandwidth Reduction Technique Providing Multiple nB+D ISDN Basic Rate Interface Links Over a Wireless Code Division Multiple Access Communication System," and a prior pending U.S. patent application Ser. No. 09/030,049 now U.S. Pat. No. 6,236,647 filed Feb. 24, 1998 entitled "Dynamic Frame Size Adjustment and Selective Reject On a Multi-Link Channel to Improve Effective Throughput and Bit Error Rate," each of which are assigned to the assignee of the present invention and all three of which are hereby incorporated by reference in their entirety.

BACKGROUND OF THE INVENTION

The increasing use of wireless telephones and personal computers has led to a corresponding demand for advanced telecommunication services that were once thought to only be meant for use in specialized applications. In the 1980's, wireless voice communication became widely available through the cellular telephone network. Such services were at first typically considered to be the exclusive province of the business person because of expected high subscriber costs. The same was also true for access to remotely distributed computer networks, whereby until very recently, only business people and large institutions could afford the necessary computers and wireline access equipment. As a result of the widespread availability of both technologies, the general population now increasingly wishes to not only have access to networks such as the Internet and private intranets, but also to access such networks in a wireless fashion as well. This is particularly of concern for the users of portable computers, laptop computers, hand-held personal digital assistants and the like who would prefer to access such networks without being tethered to a telephone line.

There still is no widely available satisfactory solution for providing low cost, high speed access to the Internet, private intranets, and other networks using the existing wireless infrastructure. This situation is most likely an artifact of several unfortunate circumstances. For one, the typical manner of providing high speed data service in the business environment over the wireline network is not readily adaptable to the voice grade service available in most homes or offices. Such standard high speed data services also do not lend themselves well to efficient transmission over standard cellular wireless handsets. Furthermore, the existing cellular network was originally designed only to deliver voice services. As a result, the emphasis in present day digital wireless communication schemes lies with voice, although certain schemes such as CDMA do provide some measure of asymmetrical behavior for the accommodation of data transmission. For example, the data rate on an IS-95 forward traffic channel can be adjusted in increments from 1.2 kilobits per second (kbps) up to 9.6 kbps for so-called Rate Set 1 and in increments from 1.8 kbps up to 14.4 kbps for Rate Set 2. On the reverse link traffic channel, however, the data rate is fixed at 4.8 kbps.

The design of such existing systems therefore typically provides a radio channel which can accommodate maximum data rates only in the range of 14.4 kilobits per second (kbps) at best in the forward direction. Such a low data rate channel does not lend itself directly to transmitting data at rates of 28.8 or even 56.6 kbps that are now commonly available using inexpensive wire line modems, not to mention even higher rates such as the 128 kbps which are available with Integrated Services Digital Network (ISDN) type equipment. Data rates at these levels are rapidly becoming the minimum acceptable rates for activities such as browsing web pages. Other types of data networks using higher speed building blocks such as Digital Subscriber Line (xDSL) service are just now coming into use in the United States. However, their costs have only been recently reduced to the point where they are attractive to the residential customer.

Although such networks were known at the time that cellular systems were originally deployed, for the most part, there is no provision for providing higher speed ISDN- or xDSL-grade data services over cellular network topologies. Unfortunately, in wireless environments, access to channels by multiple subscribers is expensive and there is competition for them. Whether the multiple access is provided by the traditional Frequency Division Multiple Access (FDMA) using analog modulation on a group of radio carriers, or by newer digital modulation schemes the permit sharing of a radio carrier using Time Division Multiple Access (TDMA) or Code Division Multiple Access (CDMA), the nature of the radio spectrum is that it is a medium that is expected to be shared. This is quite dissimilar to the traditional environment for data transmission, in which the wireline medium is relatively inexpensive to obtain, and is therefore not typically intended to be shared.

Other considerations are the characteristics of the data itself. For example, consider that access to web pages in general is burst-oriented, with asymmetrical data rate transmission requirements. In particular, the user of a remote client computer first specifies the address of a web page to a browser program. The browser program then sends this web page address data, which is typically 100 bytes or less in length, over the network to a server computer. The server computer then responds with the content of the requested web page, which may include anywhere from 10 kilobytes to several megabytes of text, image, audio, or even video data. The user then may spend at least several seconds or even several minutes reading the content of the page before requesting that another page be downloaded. Therefore, the required forward channel data rates, that is, from the base station to the subscriber, are typically many times greater than the required reverse channel data rates.

In an office environment, the nature of most employees' computer work habits is typically to check a few web pages and then to do something else for extended period of time, such as to access locally stored data or to even stop using the computer altogether. Therefore, even though such users may expect to remain connected to the Internet or private intranet continuously during an entire day, the actual overall nature of the need to support a required data transfer activity to and from a particular subscriber unit is actually quite sporadic.

Furthermore, prior art wireless communication systems provide a continuous bandwidth to individual subscribers. That is, in such networks, during a communication session the bandwidth available at all times is constant and has been designed, as noted above, primarily for voice grade use.

SUMMARY OF THE INVENTION

Prior art methodologies for transmission of data over wireless networks suffer numerous problems. As noted above, the bandwidth available for a single subscriber unit channel is typically fixed in size. However, data communications tend to be bursty in nature, often requiring a need for large amounts of bandwidth at certain times, while requiring very little amounts, or even none, at other times. These wide swings in bandwidth requirements can be very close together in time.

For example, when browsing a web site using HyperText Transfer Protocol (HTTP), the user of a web browser typically selects pages by selecting or clicking a single link to a page causing the client computer to send a small page request packet to the web server. The request packet in the receive link direction requires very little bandwidth. However, in response to the request, the server typically delivers one or more web pages ranging in size from 10 to 100 kilobits (kB) or more to the client in the forward link direction. To receive the pages, the bandwidth requirements are much greater than to request the pages. The optimum bandwidth needed to acceptably receive the pages is rarely realized due to the inefficiency of the present wireless protocols that only offer maximum data rates of about 9600 bps under optimal conditions. This results in the server having to hold back some of the requested data until the network can "catch up" with the data delivery and also results in frustrated users having slow response and page loading times. In essence, the bandwidth to send a request is more than is needed, and the bandwidth to receive the pages is not enough to deliver the data at acceptable rates.

Another problem with prior art systems is that the time frame between when the small page request message leaves the wireless network and becomes wirebound, and when the pages of requested data enter the wireless portion of the data communications session on the return link is often quite long. This time-from-request to time-of-receipt delay is a function of how congested the network and server are during that time. The invention is based in part on the observation that bandwidth is being wasted during periods of time when waiting for data from the wireline network. Prior art wireless communications systems maintain the constant availability of the full bandwidth of the 9600 bps wireless connection for that entire data communication session, even though the wireless client may be waiting for return pages. This bandwidth which is effectively unused is therefore wasted because there is no way to allocate the channel resources in use for this data communication session to another session needing more bandwidth. That is, if other concurrent wireless data communications sessions are taking place for other subscriber units, these concurrent sessions have no way in the prior art systems to take advantage of any unused bandwidth allocated to the client merely waiting for return pages, as in this example.

The present invention provides high speed data and voice service over standard wireless connections via an unique integration of protocols and existing cellular signaling, such as is available with Code Division Multiple Access (CDMA) type systems. The invention achieves high data rates through more efficient allocation of access to the CDMA channels.

Specifically, the invention provides a scheme for determining an efficient allocation of N fixed rate data channels amongst M users. The invention addresses the problem of how to allocate these channels in the most effective manner between users competing for channel use. For example, when more users exist than channels, the invention determines a set of probabilities for which users will require channel access at which times, and assigns channel resources accordingly. The invention can also dynamically take away or deallocate channels (i.e., bandwidth) from idle subscribers and provide or allocate these freed-up channels to subscribers requiring this bandwidth.

Channel resources are allocated according to a buffer monitoring scheme provided on forward and reverse links between a base station and multiple subscriber units. Data buffers are maintained for each connection between a base station and a subscriber unit. Each buffer is monitored over time for threshold levels of data to be transmitted in that buffer. In essence, the thresholds measure the "fullness" of buffers over time for each respective subscriber unit monitored. For each buffer, a probability is calculated that indicates how often a specific buffer for a specific subscriber will need to transmit data and how much data will be transmitted. This probability takes into account the arrival rates of data into the buffer, as well as which thresholds within the buffer are exceeded, as well as which resources in the form of channels are already allocated to the subscriber unit. Based on this probability, channel resources for data transmission can be either allocated or deallocated to subscriber units depending upon a forecasted need.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF A PREFERRED EMBODIMENT

Figure 1:
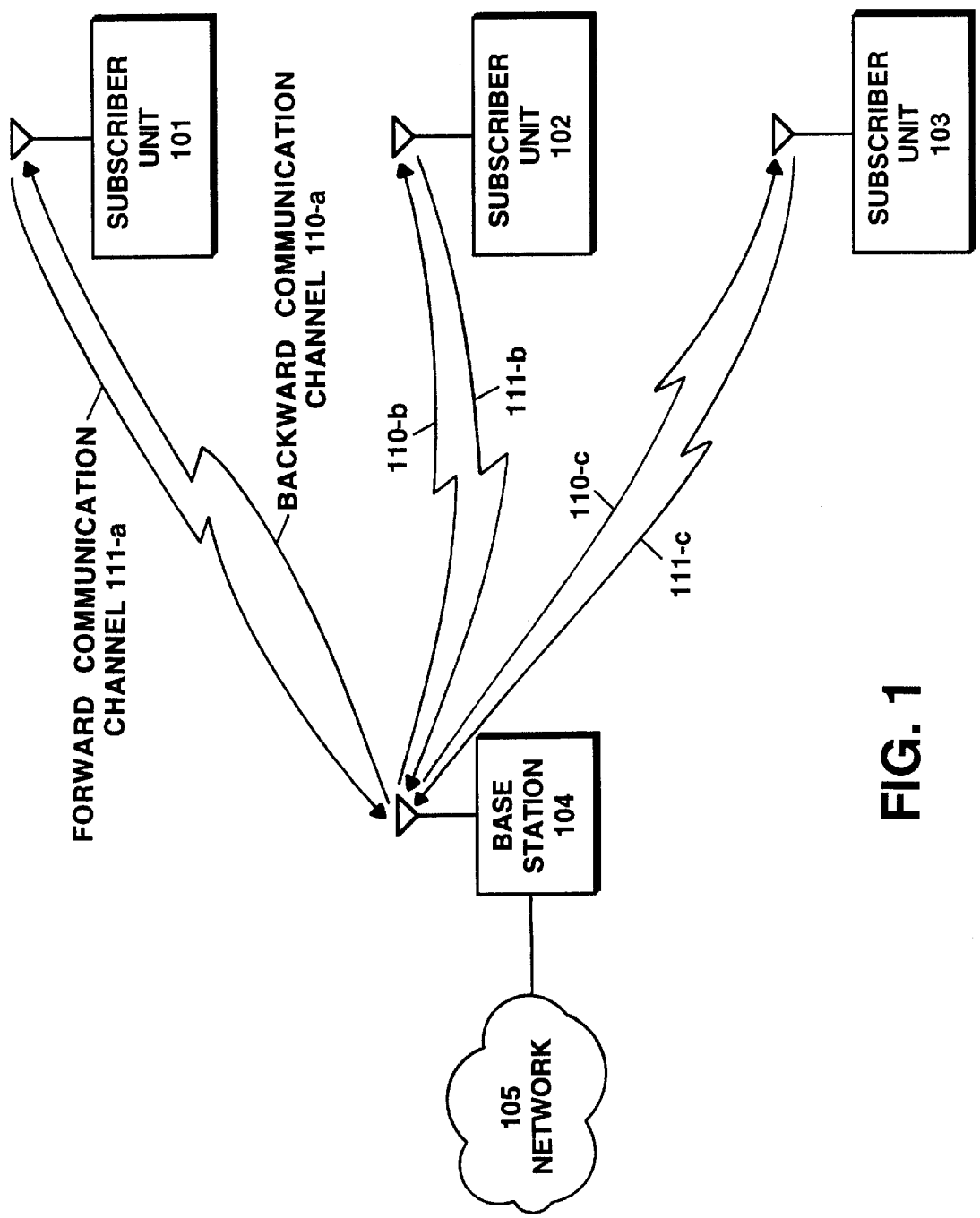
FIG. 1 is a block diagram of an example wireless communication system making use of a bandwidth management scheme according to the invention.

Turning attention now to the drawings more particularly, FIG. 1 is a block diagram of a system 100 for providing high speed data service over a wireless connection by seamlessly integrating a digital data protocol such as, for example, Integrated Services Digital Network (ISDN) with a digitally modulated wireless service such as Code Division Multiple Access (CDMA).

The system 100 consists of two different types of components, including subscriber units 101-1, 101-2, and 101-3 (collectively subscribers 101) as well as one or more base stations 104 to provide the functions necessary in order to achieve the desired implementation of the invention. The subscriber units 101 provide wireless data and/or voice services and can connect devices such as, for example, laptop computers, portable computers, personal digital assistants (PDAs) or the like through base station 104 to a network 105 which can be a Public Switched Telephone Network (PSTN), a packet switched computer network, or other data network such as the Internet or a private intranet. The base station 104 may communicate with the network 105 over any number of different efficient communication protocols such as primary rate ISDN, or other LAPD based protocols such as IS-634 or V5.2, or even TCP/IP if network 105 is an Ethernet network such as the Internet. The subscriber units 101 may be mobile in nature and may travel from one location to another while communicating with base station 104.

FIG. 1 illustrates one base station 104 and three mobile subscriber units 101 by way of example only and for ease of description of the invention. The invention is applicable to systems in which there are typically many more subscriber units communicating with one or more base stations.

It is also to be understood by those skilled in the art that FIG. 1 may be a standard cellular type communication system such as a CDMA, TDMA, GSM or other system in which the radio channels are assigned to carry between the base stations 104 and subscriber units 101. This invention, however, applies more particularly to non-voice transmissions, and preferably to digital data transmissions of varying bandwidths. Thus, in a preferred embodiment, FIG. 1 is a CDMA-like system, using code division multiplexing principles for the air interface. However, it is also to be understood that the invention is not limited to using standardized CDMA protocols such as IS-95, or the newer emerging CDMA protocol referred to as IS-95B. The invention is also applicable to other multiple access techniques.

In order to provide data and voice communications between the subscriber units 101 and base station 104, wireless transmission of data over a limited number of radio channel resources is provided via forward communication channels 110-$a$ through 110-$c$, and reverse communication channels 111-$a$ through 111-$c$. The invention provides dynamic bandwidth management of these limited channel resources on an as needed basis for each subscriber unit 101. It should also be understood that data signals travel bidirectionally across the CDMA radio channels 110 and 111, i.e., data signals originating at the subscriber units 101 are coupled to the network 105, and data signals received from the network 105 are coupled to the subscriber units 101.

Figure 2:
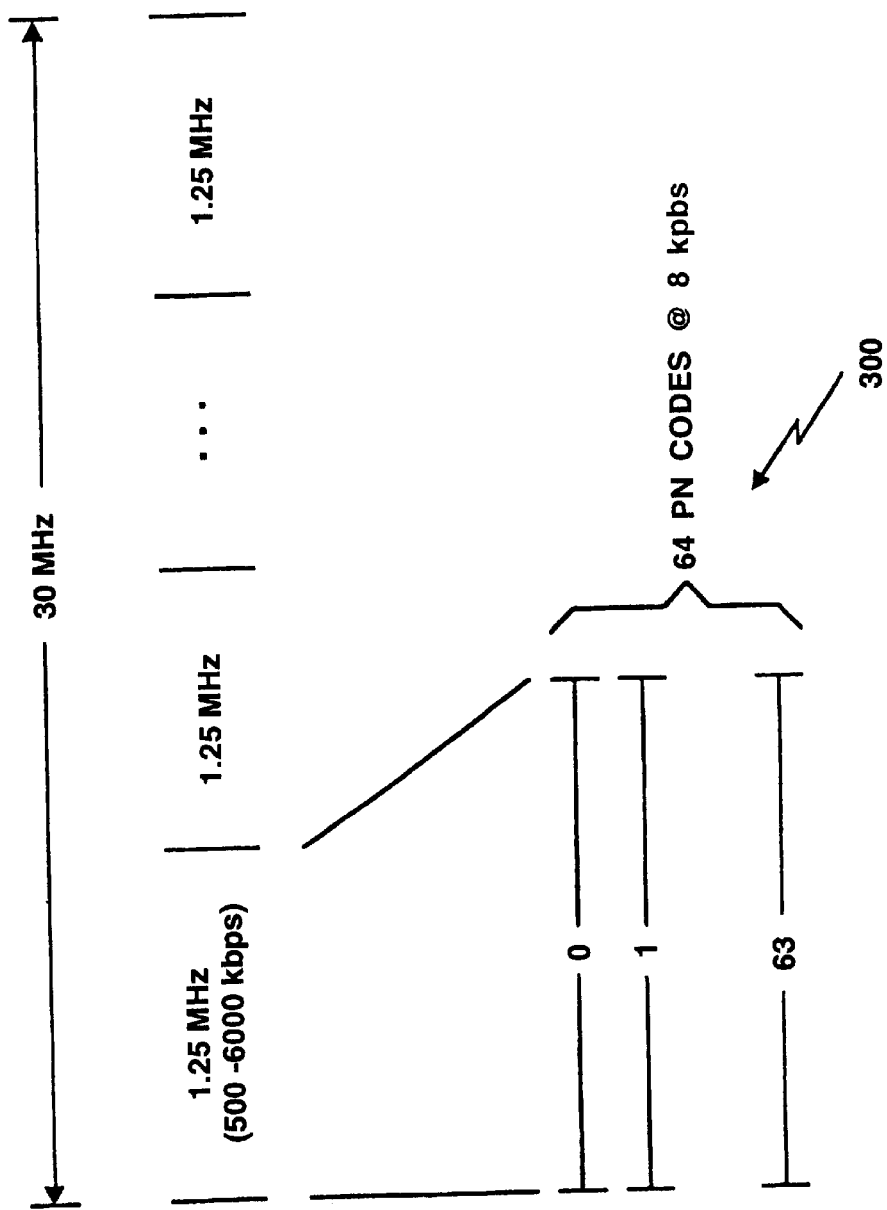
FIG. 2 is a diagram showing how channels are assigned within a given radio frequency (RF) channel.

FIG. 2 provides an example of how dynamic allocation of radio bandwidth may take place in an example system 100. First a typical transceiver within a subscriber unit 101 or the base station 104 can be tuned on command to any 1.25 MegaHertz (MHZ) channel within a much larger bandwidth, such as up to 30 MHZ in the case of the radio spectrum allocated to cellular telephony; this bandwidth is typically made available in the range of from 800 to 900 MHZ in the United States. For PCS type wireless systems, a 5 or 10 MHZ bandwidth is typically allocated in the range from about 1.8 to 2.0 GigaHertz (GHz). In addition, there are typically two matching bands active simultaneously, separated by a guard band, such as 80 MHZ; the two matching bands form a forward and reverse full duplex link between the base station 104 and the subscriber units 101.

For example, within the subscriber unit 101 and the base station 170, transmission processors (i.e., transceivers) are capable of being tuned at any given point in time to a given 1.25 MHZ radio frequency channel. It is generally understood that such 1.25 MHZ radio frequency carrier provides, at best, a total equivalent of about a 500 to 600 kbps maximum data rate transmission speed within acceptable bit error rate limitations.

In the prior art, it was thus generally understood that in order to support an ISDN type like connection which may contain information at a rate of 128 kbps that, at best, only about (500 kbps/128 kbps) or only three (3) ISDN subscriber units could be supported at best.

In contrast to this, the present invention subdivides the available approximately 500 to 600 kbps data rate among a relatively large number of channels and then provides a way to determine how to allocate these channels to best transmit data between the base station 104 and each of the subscriber units 101, and vice versa. In the illustrated example in FIG. 2, the bandwidth is divided into sixty-four (64) subchannels 300, each providing an 8 kbps data rate. It should be understood herein that within a CDMA type system, the subchannels 300 are physically implemented by encoding a data transmission with one of a number of different assignable codes. For example, the subchannels 300 may be defined within a single CDMA radio frequency (RF) carrier by using different orthogonal Walsh codes for each defined subchannel 300. (The subchannels 300 are also referred to as "channels" in the following discussion, and the two terms are used interchangeably herein).

As mentioned above, the channels 300 are allocated only as needed. For example, multiple channels 300 are granted during times when a particular subscriber unit 101 is requesting that large amounts of data be transferred. In this instance and in the preferred embodiment, the single subscriber unit 101 may be granted as many as 20 of these channels in order to allow data rates of up to 160 kbps (20 * 8 kbps) for this individual subscriber unit 101. These channels 300 are then released during times when the subscriber unit 101 is relatively lightly loaded. The invention determines the way in which the limited number of channels are divided at any moment in time among the subscriber units 101.

Figure 3:
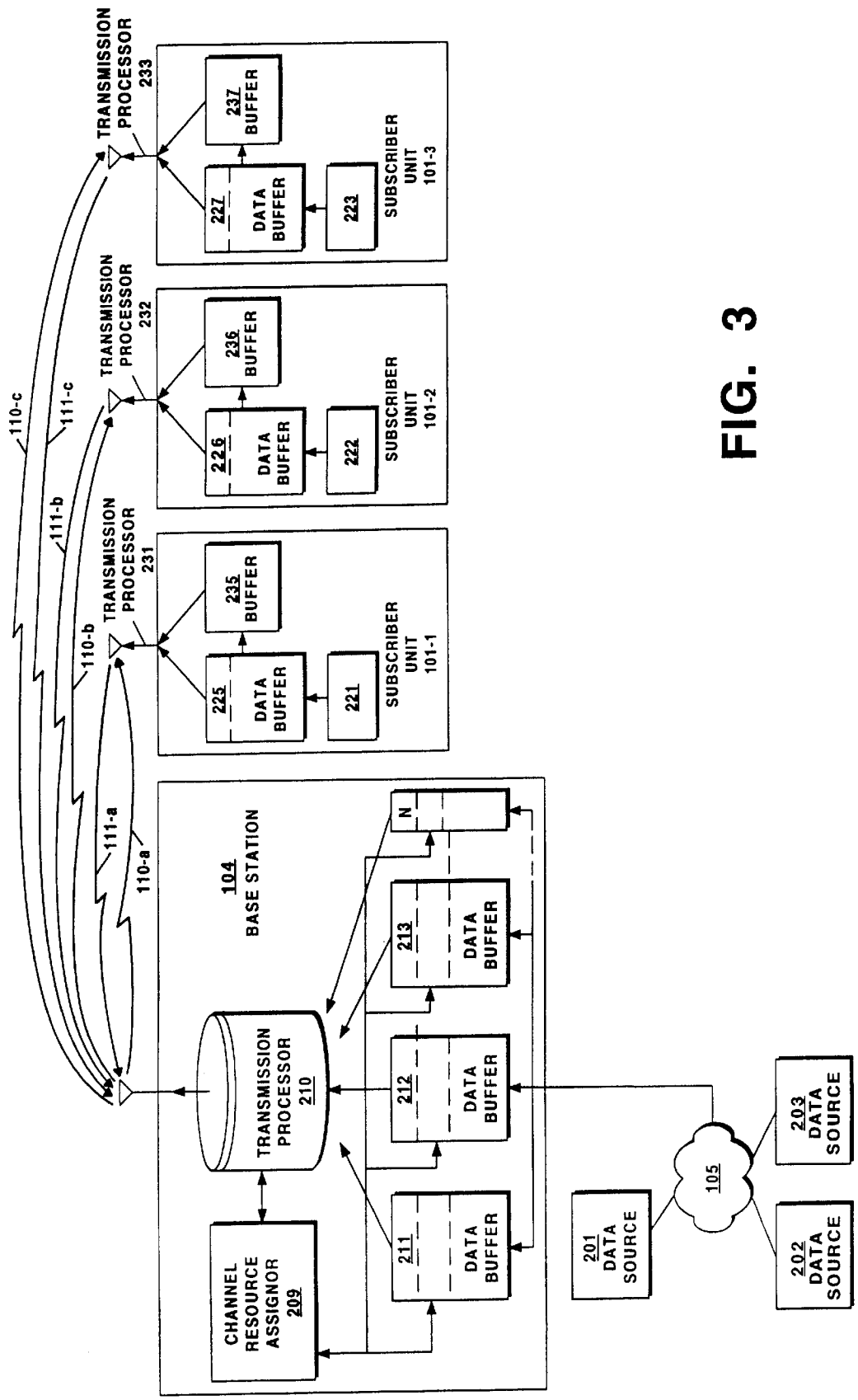
FIG. 3 is a block diagram illustrating the internal components of a base station and subscriber units that provide the dynamic bandwidth allocation mechanism.

Before discussing how the channels 300 are preferably allocated and deallocated, it will help to understand the general architecture of relevant parts of a typical subscriber unit 101 and base station 104 in greater detail. Turning attention now to FIG. 3, the base station 104 accepts data from incoming data sources 201 through 203. Each data source 201 through 203 represents any type of data source that is sending data to one or more of the subscriber units 101. For example, data source 202 may be web server software on network 105 serving web pages to a client web browser operating in conjunction with subscriber unit 101-1, while data source 203 may be an ISDN terminal on network 105 that is sending voice and data to subscriber unit 101-3.

For each subscriber unit 101 that is in communication with this particular base station 104, the base station 104 establishes and allocates a respective data buffer 211 through 213. Data buffers 211 through 213 store the data that is to be transmitted to their respective subscriber units 101. That is, in a preferred embodiment, there is a separate data buffer in the base station 104 for each respective subscriber unit 101. As subscriber units enter into and exit out of communication sessions or connections with base station 104, the number of buffers may change. There is always a one-to-one correspondence between the number of buffers 211 through 213 allocated to the number of subscriber units 101 communicating with base station 104. The buffers 211 through 213 may be, for example, queues or other memory structures controlled by software, or may be hardware controlled fast cache memory.

As data is queued up in the buffers 211 through 213, transmission processor 210 transmits the data from the base station 104 to the respective subscriber units 101. In the case of forward link transmission (from the base station 104 to the subscriber units 101), a selection of a limited number of forward link channels 110$a$ through 110$c$ are used. As will be explained, the invention is able to accommodate greater bandwidth for one particular subscriber unit 101, as more and more data is queued at the base station 104. That is, as the transmission processor 210 in the base station 104 accepts data from each buffer 211 through 213 for transmission to that buffers' respective subscriber unit 101, the transmission processor 210 uses only the allocated number of forward link 110 resources assigned to that particular respective subscriber unit. To determine how these channel resources are assigned, the invention provides a channel resource assignor 209 which implements a unique algorithm according to the invention that monitors buffer usage to determine an urgency characteristic of each subscriber unit 101 in order to dynamically assign an optimum number of channel resources to be allocated to each subscriber unit.

In the reverse direction, each subscriber unit 101 also contains a respective data source 221 through 223 that provides data to data buffers 225 through 227. The data stored in buffers 225 through 227 is data to be transmitted on one or more of the reverse links 111a–c back to the base station 104, for eventual transmission to processes or devices on network 105 that are connected at a network session layer with the subscriber units 101. Each subscriber unit 101 also contains a transmission processor 231 through 233 for controlling the transmission of data from buffers 225 through 227 back to base station 104. As in the base station 104, the transmission processors 231 through 233 only use an allocated number of reverse channel 111a–c resources assigned to that particular respective subscriber unit 101.

In a preferred embodiment of the invention, the channel resource assignor 209 in the base station also monitors the usage of buffers 225 through 227 within subscriber units 101. This is accomplished via buffer monitors 235 through 237 in each subscriber unit 101 which periodically report buffer characteristics back to base station 104. The buffer characteristics reports may be piggybacked onto the regular transmission of data on the reverse links 111a–c. Upon receipt of this buffer characteristic information, the channel resource assignor 209 then determines an urgency factor representing the relative need for each subscriber unit 101 to transmit data on the reverse links 111a–c from their respective buffers 225 through 227. Using these urgency factors, the channel resource assignor 209 can then dynamically assign an optimum number of channel resources which each subscriber unit may use on the reverse links 111a–c. This channel assignment information sent back to the subscriber units 101 on the forward links 110, so that the transmission processors 231 through 233 know their currently allocated channels at all times.

The channel resource assignor 209 is thus a bandwidth management function that includes the dynamic management of the bandwidth allocated to a particular network layer session connection. Before a further description of the channel assignor 209 is given, it should be first understood that no matter what bandwidth allocation is given to a particular subscriber unit 101, a network layer communication session will be maintained even though wireless bandwidth initially allocated for transmission is reassigned to other connections when there is no information to transmit. One manner of maintaining network layer communication sessions during periods of reduced allocation of bandwidth for a particular subscriber unit is discussed in detail in the above-referenced co-pending patent applications, the entire contents of which are hereby incorporated by reference in their entirety.

In general, bandwidth assignments are made for each network layer session based upon measured short term data rate needs as determined by buffer statistics. One or more channels are then assigned based upon these measurements and other parameters such as amount of data in the buffer, the present resources allocated to a subscriber unit, and probabilities of a requirement of a subscriber unit to transmit data or priority of service as assigned by the service provider. In addition, when a given session is idle, a connection is preferably still maintained end to end, although with a minimum number of channel resources allocated, such as a single subchannel being assigned. This single subchannel may eventually be dropped after a predetermined minimum idle time is observed.

Figure 4:
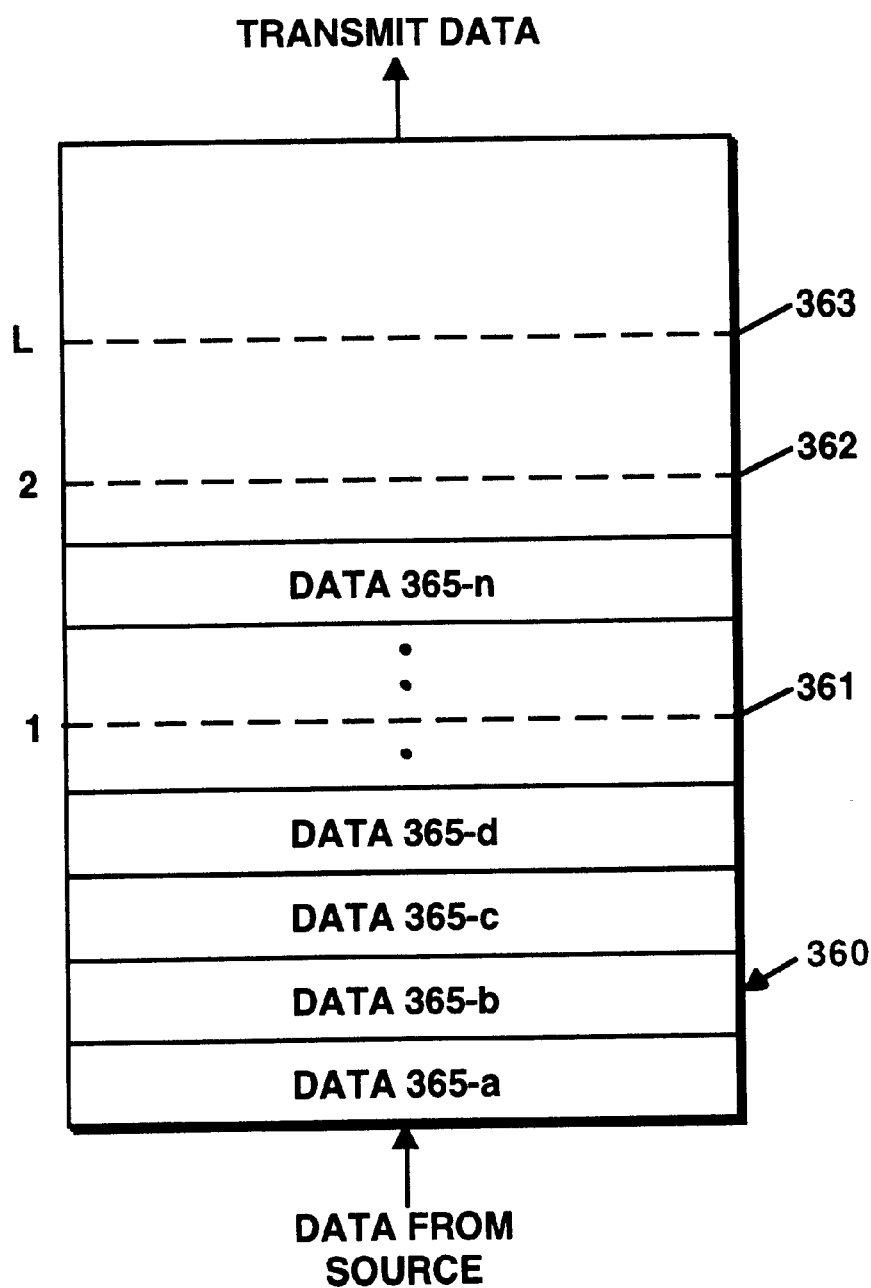
FIG. 4 illustrates the structure of the buffers used in either the base station or subscriber units.

FIG. 4 illustrates a buffer 360 in detail. Buffer 360 can be any one of the buffers 211 through 213 or 225 through 227 in either the subscriber units 101 or base station 104. The buffer 360 accepts data 365 and stores this data while awaiting transmission on forward links 110 from the base station 104 to a respective subscriber unit 101, or on reverse links 111 from one of the subscriber units to the base station 104. Each buffer has associated with it L thresholds, which in this example are labeled 1, 2, . . . L and numbered 361, 362 and 363 respectively. These L thresholds are an indication of how much data is currently stored in the buffer 360. That is, the thresholds are "characteristics" in the sense that they provide an indication of how much buffer memory is currently in use.

As data 365 enters and fills buffer 360, until transmission of this data takes place, the data may fill buffer 360 so much so as to cross certain of the thresholds 361 through 363. For instance, in FIG. 4, data blocks 365-a through 365-d have just filled buffer 360 enough to approach the first threshold 361. The last block of data 365-n exists between thresholds 361 and 362 and so the buffer 360 has stored data in an amount exceeding the first threshold 361. In other words, buffer 360 as shown has a threshold level of "1", corresponding to the first threshold 361.

As explained above, the channel resource assignor 209 in base station 104 obtains an indication of the threshold level for each buffer 225 through 227 in each respective subscriber unit 101-1 through 101-3. By determining how much data is in each buffer, the resulting data arrival rates of data to each buffer, and the resources currently allocated to transmit data from a buffer, an urgency factor for each data source attempting to transmit on the reverse links 111 is computed. A similar computation takes place for each data transmitter on the forward links 110.

More particularly, an urgency factor is calculated for each buffer based on these buffer characteristics, that indicates the relative need to empty the buffer for that particular receiver as compared to the buffers in other receivers. Given urgency factors for each buffer having data queued for transmission to a waiting receiver, the invention is able to determine how to allocate the available channels to best transmit this data.

The urgency factor for buffer 360, for example, is based on statistical information gathered for the accumulation of data 365. The statistical information is used to compute probabilities of when data 365 exceeds or does not exceed certain of the L discrete data thresholds 361, 362 and 363. Thus, as data 365 enters buffer 360 and exceeds the first threshold 361, the urgency factor for that buffer, and hence for the receiver associated with that buffer (i.e., for example, one of the subscriber units 101 for which data 365 in buffer 360 is destined) increases.

The urgency factor for buffer 360 is also based upon conditional probabilities of how much time has passed since buffer 360 has had data 365 transmitted from the buffer to its intended receiver, as well as how much time has passed since data 365 has been received at the buffer 360 for storage until transmission may occur. The urgency factor depends partly on the history of the time that the data level in the buffer exists between each threshold in the buffer and on the number of times each threshold, including the maximum buffer capacity, is exceeded.

The urgency factor is also based on how close data 365 is to the last threshold L 363, which indicates that the buffer is reaching maximum capacity. The urgency factor therefore also accounts for the probability of exceeding the capacity of buffer 360, based on exceeding the maximum threshold L 363.

The channel resource allocator 209 therefore calculates an urgency factor, U, for each of M buffers, where M is the total number of buffers used in the reverse 111 and forward 110 links. The urgency factor for the buffers servicing the forward links 110 are calculated independently of urgency factors for the other buffers servicing the reverse links 111, and the buffers servicing each transmission direction of a particular connection between a particular one of the subscriber units 101 and the base station 104 are independent of one another.

At any given time, a given buffer J has a number of channels, $N_J$, which is the number of channels already allocated to that particular buffer J. Accordingly, $N_J$ must range from $1<N_J<N_{MAX}$, where $N_{MAX}$ is the maximum number of channel resources 300 that may be assigned to any one particular buffer, and hence to any one link. In the preferred embodiment, $N_{MAX}$ can be as high as 20 channels, with each channel operating at approximately 8.55 kilobits per second (kbps) or at 13.3 kbps, depending upon a rate selection as determined by which CDMA standard is used. Thus, if a particular buffer is assigned the maximum number of channels to accommodate data transfers for high bandwidth applications, instantaneous data rates may be achieved as high as from about 171 kbps to 260 kbps.

The urgency factor U for a given buffer is equal to the sum of weighted conditional probabilities. Each conditional probability represents the chance of exceeding the last threshold L, within a time frame, $T_S$, given that the data in the buffer has already exceeded a particular threshold $E_i$. The time frame $T_S$ corresponds to the maximum time needed to reallocate a resource. The probabilities for an urgency factor U for a single buffer are all computed in a similar manner, but are based upon different thresholds within that buffer. Thus, as the probabilities for each threshold change with the various demands for service, the urgency factor for that particular buffer also changes.

In a preferred embodiment, the probability of exceeding a particular threshold $E_L$ in time $T_S$ given that another threshold $E_i$ is exceeded is given by:

$$P_{EL}(T_S \mid E_i) = \frac{P_{EL}(E_i) \cdot P_{EL}(T_S)}{P_{EL}(E_j)}$$

Threshold $E_i$ is used in the above equation when computing the probability of exceeding a threshold $E_L$, in a time period $T_S$, given that the data level in the buffer has already crossed threshold $E_j$. Since this is an indirect computation, it may be derived from the formula:

$$\frac{\sum(P_{EL} \text{ within } T_S \text{ of } E_i) / \sum(E_i \text{ for } T_S)}{\sum(E_L / E_i)}$$

The probabilities that make up the urgency factor U for a particular buffer are also weighted before they are summed, such as $$U = \Sigma_i P_{E^L}(T_S \mid E_i) \cdot W_i(N)$$

The weight $W_i(N)$ for each probability is selected to optimize the resource allocation. For example, the weight is selected based upon which threshold is crossed and therefore effects the urgency factor for that buffer by increasing the weight of the summed probabilities used to compute that urgency factor for that buffer.

Once an urgency factor U for each buffer has been computed, the channel resource assignor 209 determines how to allocate the available channels among the buffers. This is accomplished in a preferred embodiment by determining which buffer has the highest urgency factor and which one has the lowest. Next, the highest and lowest urgency factors must exceed respective high and low urgency thresholds. If this is true, one resource channel is deallocated from the buffer with the lowest urgency factor and is reallocated to the buffer with the highest urgency factor. In this manner, the channel resources for buffers may change over time based upon the urgency factors of the buffers.

Also, when $N_J$ is 1, there is only one channel allocated to a particular buffer. In this state, the assigned channel resource may be reallocated (i.e., taken away) to another buffer if there is no data in buffer and if the probability of exceeding the buffer capacity within the time it takes to reassign this initial resource, $P_{E^L}(T_S \mid E_O)$, is less than the probability of reaching the buffer overflow limit $P(E_L)$, which is a predetermined constant.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A system for allocating and deallocating channel resources from a limited number of channel resources used to transmit data over a connection from a transmitter to a receiver, comprising:

a transmitter having an input that receives data to be transmitted to the receiver associated with the transmitter via the respective connection;

a plurality of buffers within the transmitter, each one of the plurality of buffers associated with a particular connection between a respective transmitter and receiver, each one of the plurality of buffers having an associated plurality of thresholds, each threshold associated with a level of data presently stored in the respective one of the plurality of buffers; and a transmission processor within the transmitter which controls the transmission of data from the buffers to the channel resources, such that a respective buffer may use one or more of a number of channel resources allocated to the respective connection; and a channel resource assignor which monitors the state of thresholds in the plurality of buffers, each buffer associated with a respective one of the connections, the channel resource assignor computes an urgency factor associated with each buffer, based upon statistical information determined from the threshold level states, the urgency factor representing a relative need for transmission to the respective receiver associated with that buffer and the channel resource assignor comparing the buffer urgency factors for the plurality of buffers to determine how many channel resources are to be allocated to each respective connection.

2. The system in claim 1, wherein the statistical information used to compute the urgency factor associated with a buffer includes statistics based upon threshold levels of data in the buffer, current resources allocated to the receiver associated with that buffer, and data arrival rates of data to that buffer.

3. The system in claim 1, wherein the statistical information used to compute the urgency factor associated with the buffer includes conditional probabilities of how much time has passed since the buffer has had data transmitted from the buffer to its intended receiver, as well as how much time has passed since data has been received at that input of the transmitter associated with that buffer.

4. The system of claim 1, wherein the urgency factor for a given buffer is based upon a sum of weighted conditional probabilities, each conditional probability representing the chance of exceeding a threshold $E_L$ in the buffer, within a time frame $T_S$ which corresponds to a maximum time needed to reallocate a channel resource to another buffer, given that data in the buffer has already exceeded a particular threshold $E_i$, each conditional probability for each threshold in a buffer given by the formula:

$$P_{EL}(T_S \mid E_i) = \frac{P_{EL}(E_i) \cdot P_{EL}(T_S)}{P_{EL}(E_j)}$$

which is derived from the formula:

$$\frac{\sum (P_{EL} \text{ within } T_S \text{ of } E_i) / \sum (E_i \text{ for } T_S)}{\sum (E_L / E_i)}.$$

5. The system of claim 4, wherein the conditional probabilities that make up the urgency factor U for a particular buffer are weighted before they are summed, according to the formula:

$$U = \Sigma_i P_{E^L}(T_S|E_i) \cdot W_i(N)$$

wherein weight $W_i$ is selected based upon which threshold N is crossed by data currently in the buffer.

6. The system of claim 5, wherein the transmitter including at least one buffer is located in a base station operating a Code Division Multiple Access communication protocol and the at least one receiver comprises a plurality of subscriber units, each subscriber unit operating the Code Division Multiple Access communication protocol and the transmitter communicates with the receiver using a number of channel resources selected from the limited number of channel resources assigned to a forward link.

7. The system of claim 5, wherein the transmitter including at least one buffer is located in a subscriber unit operating a Code Division Multiple Access communication protocol and the at least one receiver is located in a base station operating the Code Division Multiple Access communication protocol and the transmitter communicates with the receiver using a number of channel resources selected from the limited number of channel resources assigned to a reverse link.

8. The system of claim 1 wherein the channel resource assignor determines how to allocate the available channels among the buffers by determining if the buffer having the highest urgency factor U exceeds a respective high threshold and if the buffer having the lowest urgency factor U exceeds a respective low threshold, and if so, deallocating one resource channel is from the buffer with the lowest urgency factor and reallocating the one resource channel to the buffer with the highest urgency factor.

9. The system of claim 8, wherein, for a first buffer, if the channel resource assignor determines that there is only one channel resource allocated to the first buffer, the one channel resource may be reallocated to a second buffer if there is no data in the second buffer and if the probability of exceeding the buffer capacity within the time it takes to reassign this initial resource, $P_{EL}(T_S|E_O)$, is less than the probability of reaching the buffer overflow limit $P(E_j)$.

10. The system of claim 1, wherein the transmitter including at least one buffer is located in a base station operating a Code Division Multiple Access communication protocol and the at least one receiver comprises a plurality of subscriber units, each subscriber unit operating the Code Division Multiple Access communication protocol and the transmitter communicates with the receiver using a number of channel resources selected from the limited number of channel resources assigned to a forward link.

11. The system of claim 1, wherein the transmitter including at least one buffer is located in a base station operating a Code Division Multiple Access communication protocol and the at least one receiver comprises a plurality of subscriber units, each subscriber unit operating the Code Division Multiple Access communication protocol and the transmitter communicates with the receiver using a number of channel resources selected from the limited number of channel resources assigned to a forward link.

12. The system of claim 1, wherein the transmitter including at least one buffer is located in a subscriber unit operating a Code Division Multiple Access communication protocol and the at least one receiver is located in a base station operating the Code Division Multiple Access communication protocol and the transmitter communicates with the receiver using a number of channel resources selected from the limited number of channel resources assigned to a reverse link.

13. The system of claim 1, wherein the transmitter including at least one buffer is located in a subscriber unit operating a Code Division Multiple Access communication protocol and the at least one receiver is located in a base station operating the Code Division Multiple Access communication protocol and the transmitter communicates with the receiver using a number of channel resources selected from the limited number of channel resources assigned to a reverse link.

14. A method for allocating and deallocating channel resources from a limited number of channel resources used to transmit data over a connection from a transmitter to a receiver, the method comprising the steps of:

receiving, at a transmitter, data to be transmitted the receiver associated with the transmitter via the respective connection;

storing the data to be transmitted in a plurality of buffers within the transmitter, each one of the plurality of buffers associated with a particular connection between a respective transmitter and receiver, each of the buffers having a plurality of thresholds, each threshold associated with a level of data presently stored in the respective one of the buffers;

controlling the transmission of data from the buffers to the channel resources at a transmission processor within the transmitter such that a respective buffer may use one or more of a number of channel resources allocated to the respective connection;

monitoring the state of thresholds in the plurality of buffers by a channel resource assignor each buffer associated with a respective one of the connections;

computing an urgency factor associated with each buffer based upon a statistical information determined from the threshold level states, the urgency factor representing a relative need for transmission to the respective receiver associated with that buffer; and comparing the buffer urgency factors for the plurality of buffers to determine how many channel resources are to be allocated to each respective connection.

15. The method of claim 14, further including the step of basing the statistical information used to compute the urgency factor associated with a buffer on statistics including threshold levels of data in the buffer, current resources allocated to the receiver associated with that buffer, and data arrival rates of data to that buffer.

16. The method of claim 14, further including the step of basing the statistical information used to compute the urgency factor associated with the buffer on conditional probabilities of how much time has passed since the buffer has data transmitted from the buffer to its intended receiver, as well as how much time has passed since data has been received at that input of the transmitter associated with that buffer.

17. The method of claim 14, further including the step of basing the urgency factor for a given buffer upon a sum of weighted conditional probabilities, each conditional probability representing the chance of exceeding a threshold $E_L$ in the buffer, within a time frame $T_S$ which corresponds to a maximum time needed to reallocate a channel resource to another buffer, given that data in the buffer has already exceeded a particular threshold $E_i$, each conditional probability for each threshold in a buffer given by the formula:

$$P_{EL}(T_S \mid E_i) = \frac{P_{EL}(E_i) \cdot P_{EL}(T_S)}{P_{EL}(E_j)}$$

which is derived from the formula:

$$\frac{\sum (P_{EL} \text{ within } T_S \text{ of } E_i) / \sum (E_i \text{ for } T_S)}{\sum (E_L / E_i)}.$$

18. The method of claim 17, further including the steps of weighting the conditional probabilities that make up the urgency factor U for a particular buffer before they are summed, according to the formula:

$$U = \Sigma_i P_{E^L}(T_S \mid E_i) \cdot W_i(N)$$

and selecting the weight $W_i$ based upon which threshold N is crossed by data currently in the buffer.

19. The method of claim 14 further including the steps of:

determining how to allocate the available channels among the buffers by determining if the buffer having the highest urgency factor U exceeds a respective high threshold and if the buffer having the lowest urgency factor U exceeds a respective low threshold, and if so, deallocating one resource channel is from the buffer with the lowest urgency factor and reallocating the one resource channel to the buffer with the highest urgency factor.

20. The method of claim 19 further comprising the steps of:

for a first buffer, if the channel resource assignor determines that there is only one channel resource allocated to the first buffer, the one channel resource may be reallocated to a second buffer if there is no data in the second buffer and if the probability of exceeding the buffer capacity within the time it takes to reassign this initial resource, $P_{E^L}(T_S \mid E_O)$, is less than the probability of reaching the buffer overflow limit $P(E_L)$.

21. The method of claim 14, wherein the transmitter including at least one buffer is located in a base station operating a Code Division Multiple Access communication protocol and the at least one receiver comprises a plurality of subscriber units, each subscriber unit operating the Code Division Multiple Access communication protocol and the transmitter communicates with the receiver using a number of channel resources selected from the limited number of channel resources assigned to a forward link.

22. The method of claim 14, wherein the transmitter including at least one buffer is located in a subscriber unit operating a Code Division Multiple Access communication protocol and the at least one receiver is located in a base station operating the Code Division Multiple Access communication protocol and the transmitter communicates with the receiver using a number of channel resources selected from the limited number of channel resources assigned to a reverse link.

* * * * *

UNITED STATES PATENT AND TRADEMARK OFFICE
CERTIFICATE OF CORRECTION

PATENT NO. : 6,388,999 B1
DATED : May 14, 2002
INVENTOR(S) : Thomas E. Gorsuch, Carlo Amalfitano and James A. Proctor, Jr.

It is certified that error appears in the above-identified patent and that said Letters Patent is hereby corrected as shown below:

<u>Title page,</u>
Item [75], delete "James A. Proctor" and insert -- James A. Proctor, Jr. --

Signed and Sealed this

Twenty-fifth Day of June, 2002

*Attest:*

*Attesting Officer*

JAMES E. ROGAN
*Director of the United States Patent and Trademark Office*